(12) United States Patent
Keen et al.

(10) Patent No.: US 10,832,040 B2
(45) Date of Patent: Nov. 10, 2020

(54) COGNITIVE RENDERING OF INPUTS IN VIRTUAL REALITY ENVIRONMENTS

(71) Applicant: International Business Machines Corporation, Armonk, NY (US)

(72) Inventors: Martin G. Keen, Cary, NC (US); Brian M. Burnette, Durham, NC (US); Justin S. Teasley, Durham, NC (US); Todd Neill, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/147,180

(22) Filed: Sep. 28, 2018

(65) Prior Publication Data

US 2020/0104580 A1    Apr. 2, 2020

(51) Int. Cl.
| | |
|---|---|
| *G06K 9/00* | (2006.01) |
| *G06F 21/31* | (2013.01) |
| *G06F 21/32* | (2013.01) |
| *G06T 19/00* | (2011.01) |
| *G10L 15/22* | (2006.01) |
| *G06N 20/00* | (2019.01) |

(52) U.S. Cl.
CPC ....... *G06K 9/00335* (2013.01); *G06F 21/316* (2013.01); *G06F 21/32* (2013.01); *G06N 20/00* (2019.01); *G06T 19/006* (2013.01); *G10L 15/22* (2013.01)

(58) Field of Classification Search
None
See application file for complete search history.

(56) References Cited

U.S. PATENT DOCUMENTS

| | | |
|---|---|---|
| 6,057,856 A | 5/2000 | Miyashita et al. |
| 8,253,746 B2 | 8/2012 | Geisner et al. |
| 8,687,021 B2 | 4/2014 | Bathiche et al. |

(Continued)

OTHER PUBLICATIONS

Peinado et al., "Accurate On-line Avatar Control with Collision Anticipation," Proceedings of the ACM symposium on Virtual reality software and technology (VRST '07), Nov. 2007, pp. 89-98.

(Continued)

*Primary Examiner* — Tize Ma
(74) *Attorney, Agent, or Firm* — Zilka-Kotab, P.C.

(57) ABSTRACT

A computer-implemented method for cognitive rendering of inputs received by a virtual reality (VR) system includes: receiving sensor data from at least one sensor of the VR system, the sensor data corresponding to one or more behaviors exhibited by a user of the VR system; comparing the sensor data to a predetermined list of expected behaviors; and determining the sensor data identifies an unexpected behavior in response to determining, based on the comparison, the behavior is not one of the expected behaviors. Various embodiments of the general inventive concept described above are presented in the form of methods, systems, and computer program products, all generally relating to real-time detection/anticipation of unexpected behaviors exhibited by a user but not relevant to a VR experience, and avoiding the rendering of movements, speech, etc. that are part of the unexpected behavior in order to improve the immersive nature of the VR experience.

14 Claims, 4 Drawing Sheets

(56) References Cited

U.S. PATENT DOCUMENTS

| | | | |
|---|---|---|---|
| 9,607,573 | B2 | 3/2017 | Kanevsky et al. |
| 10,004,451 | B1* | 6/2018 | Proud .................. A61M 21/02 |
| 2009/0141023 | A1 | 6/2009 | Shuster |
| 2011/0007079 | A1 | 1/2011 | Perez et al. |
| 2014/0105407 | A1 | 4/2014 | Herger et al. |
| 2015/0310196 | A1* | 10/2015 | Turgeman ............. G06F 21/552 |
| | | | 726/19 |
| 2016/0317781 | A1* | 11/2016 | Proud .................. A61M 21/02 |
| 2018/0288586 | A1* | 10/2018 | Tran ....................... A63B 69/38 |
| 2019/0200920 | A1* | 7/2019 | Tien ..................... A61B 5/0205 |

OTHER PUBLICATIONS

Mazzarino et al., "Improving the Believability of Virtual Characters Using Qualitative Gesture Analysis," Lecture Notes in Computer Science, vol. 5085, 2007, pp. 48-56.

McCormick, R., "IBM makes it so Star Trek Bridge Crew gets Watson-powered voice commands," The Verge, May 11, 2017, 2 pages, retrieved from https://www.theverge.com/2017/5/11/15621930/star-trek-bridge-crew-voice-commands-ibm-watson.

Digi-Capital, "Record $2 billion AR/VR investment in last 12 months," Digi-Capital, Jul. 13, 2016, 9 pages, retrieved from https://www.digi-capital.com/news/2016/07/record-2-billion-arvr-investment-in-last-12-months/.

* cited by examiner

COGNITIVE RENDERING OF INPUTS IN VIRTUAL REALITY ENVIRONMENTS

BACKGROUND

The present invention relates to rendering of inputs provided to virtual reality systems in a virtual reality environment, and more specifically, this invention relates to avoiding rendering input received by the virtual reality system that is irrelevant to the virtual reality environment using cognitive learning techniques.

In many virtual reality (VR) environments a VR user is represented by an avatar. As the VR user moves their head, moves across a room, or moves a hand holding a controller, those moves are mirrored by their avatar in the VR environment. "Social VR" is an environment inhabited by multiple avatars, each one representing a real person, in which the immersion and empathy foster a sense of community. A VR user can see and interact with other avatars representing other real people. However this immersion is quickly broken when an individual, and by proxy their avatar, acts in a way that is inconsistent with their VR environment, e.g. by providing input to the VR system that is irrelevant to the VR environment.

For example, if a user speaks to another person (pet, virtual assistant, etc.) in the same physical space as the user but not participating in the VR experience, or speaks to a user participating in the VR experience about a subject not relevant in the context of the VR environment, the user's speech is nonetheless conveyed to the virtual environment, breaking the immersive aspect of the VR experience. Similarly, if a user makes a physical motion not relevant to the VR experience, such as removing or repositioning a headset in order to take a drink, or view the user's physical environment, this will be rendered as an unnatural (and possibly disturbing) motion by the user's avatar in the VR environment. Another example is a user moving around within a physical environment, which can cause the user's avatar to disappear, or apparently penetrate solid objects such as walls. Rendering these and other inputs that are not relevant to a VR experience detriment the quality of the experience.

Existing techniques for addressing this type of problem allow a user to manually control input sensors, e.g. muting a microphone, tailoring sensor sensitivity (e.g. by defining a "dead zone" within which inputs are ignored), turning off a camera, etc. However, these techniques rely on the user to self-police actions and sensors, which in practice does not effectively address occurrence and rendering of irrelevant input in the VR environment.

Indeed, no current technology exists for addressing such irrelevant inputs in real-time, as is necessary to avoid the detrimental effect on the VR experience. Direct, real-time detection of the irrelevant input itself may not be possible given network latency, and difficulty distinguishing such irrelevant inputs from relevant inputs. For example, a vigorous nod or head shake may appear, for all intensive purposes, identical to a user beginning to remove a headset. Similarly, a relevant and irrelevant statement by the user may have substantial overlap or identity in content, e.g. "I am going to attack point A" versus "I am going to do my homework later."

Accordingly, it would be of great benefit to VR experiences, particularly those involving multiple users interacting with one another, to automatically discern and filter irrelevant inputs from relevant inputs so that irrelevant inputs are not rendered in the virtual environment.

SUMMARY

According to one embodiment, a computer-implemented method for cognitive rendering of inputs received by a virtual reality (VR) system includes: receiving sensor data from at least one sensor of the VR system, the sensor data corresponding to one or more behaviors exhibited by a user of the VR system; comparing the sensor data to a predetermined list of expected behaviors; and determining the sensor data identifies an unexpected behavior in response to determining, based on the comparison, the behavior is not one of the expected behaviors.

According to another embodiment, a computer program product for cognitive rendering of inputs received by a virtual reality (VR) system includes a computer readable storage medium having program instructions embodied therewith, where the computer readable storage medium is not a transitory signal per se, and the program instructions are executable by a virtual reality (VR) system to cause the VR system to perform a method. The method includes: receiving sensor data from at least one sensor of the VR system, the sensor data corresponding to one or more behaviors exhibited by a user of the VR system; comparing, using a processor of the VR system, the sensor data to a predetermined list of expected behaviors; and determining, using the processor, the sensor data identifies an unexpected behavior in response to determining, based on the comparison, the behavior is not one of the expected behaviors.

According to yet another embodiment, a virtual reality (VR) system includes: a processor; and logic integrated with the processor, executable by the processor, or integrated with and executable by the processor. The logic is configured to: receive sensor data from at least one sensor of the VR system, the sensor data corresponding to one or more behaviors exhibited by a user of the VR system; compare the sensor data to a predetermined list of expected behaviors; and determine the sensor data identifies an unexpected behavior in response to determining, based on the comparison, the behavior is not one of the expected behaviors.

Other aspects and embodiments of the present invention will become apparent from the following detailed description, which, when taken in conjunction with the drawings, illustrate by way of example the principles of the invention.

DETAILED DESCRIPTION

Figure 1:
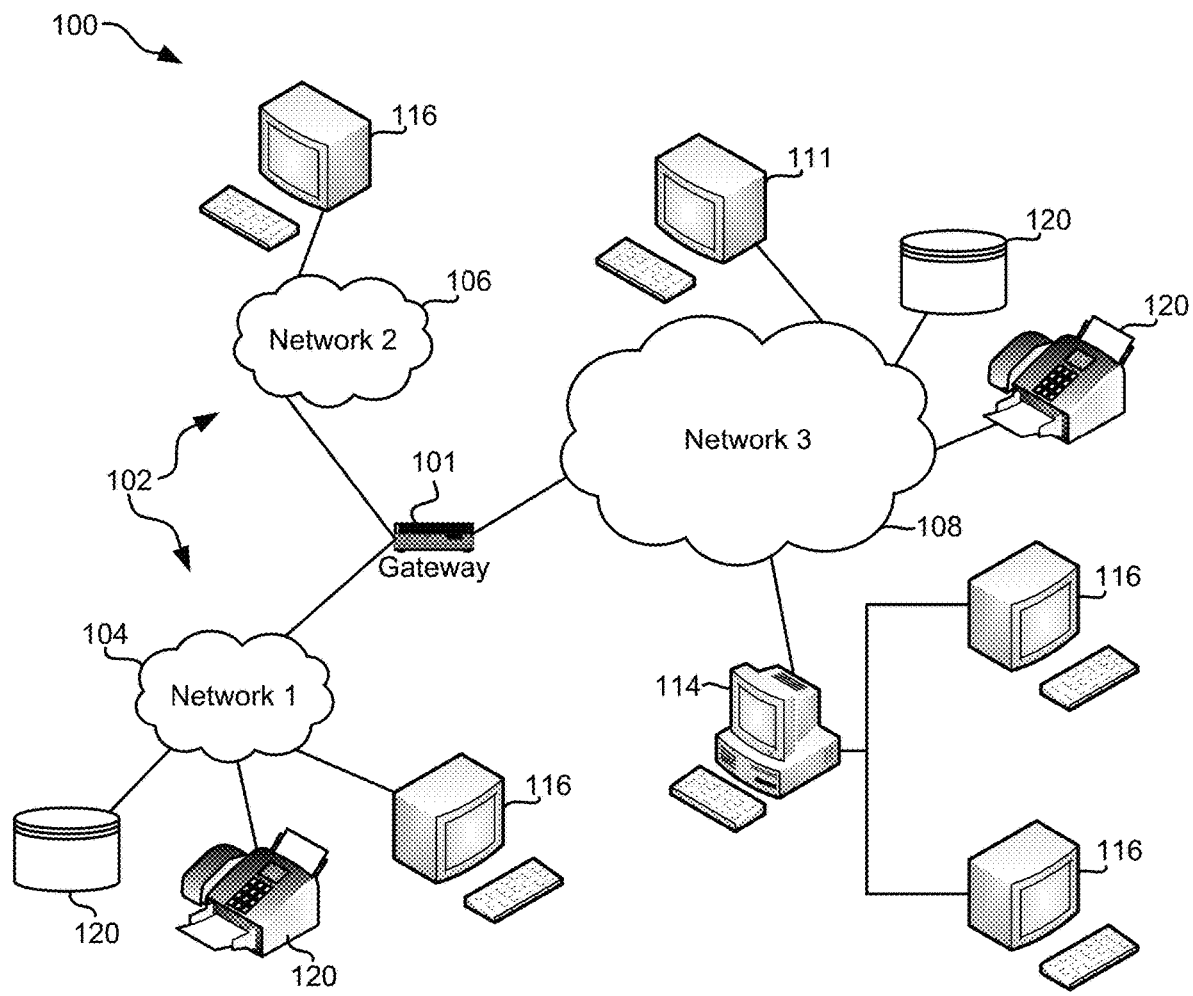
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products providing a cognitive approach to detecting and discerning relevant from irrelevant inputs in the context of VR experiences.

The approach is "cognitive" in that it is capable of learning over time, improving the ability to discern relevant from irrelevant inputs.

According to one general embodiment, a computer-implemented method for cognitive rendering of inputs received by a virtual reality (VR) system includes: receiving sensor data from at least one sensor of the VR system, the sensor data corresponding to one or more behaviors exhibited by a user of the VR system; comparing the sensor data to a predetermined list of expected behaviors; and determining the sensor data identifies an unexpected behavior in response to determining, based on the comparison, the behavior is not one of the expected behaviors.

According to another general embodiment, a computer program product for cognitive rendering of inputs received by a virtual reality (VR) system includes a computer readable storage medium having program instructions embodied therewith, where the computer readable storage medium is not a transitory signal per se, and the program instructions are executable by a virtual reality (VR) system to cause the VR system to perform a method. The method includes: receiving sensor data from at least one sensor of the VR system, the sensor data corresponding to one or more behaviors exhibited by a user of the VR system; comparing, using a processor of the VR system, the sensor data to a predetermined list of expected behaviors; and determining, using the processor, the sensor data identifies an unexpected behavior in response to determining, based on the comparison, the behavior is not one of the expected behaviors.

According to yet another general embodiment, a virtual reality (VR) system includes: a processor; and logic integrated with the processor, executable by the processor, or integrated with and executable by the processor. The logic is configured to: receive sensor data from at least one sensor of the VR system, the sensor data corresponding to one or more behaviors exhibited by a user of the VR system; compare the sensor data to a predetermined list of expected behaviors; and determine the sensor data identifies an unexpected behavior in response to determining, based on the comparison, the behavior is not one of the expected behaviors.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
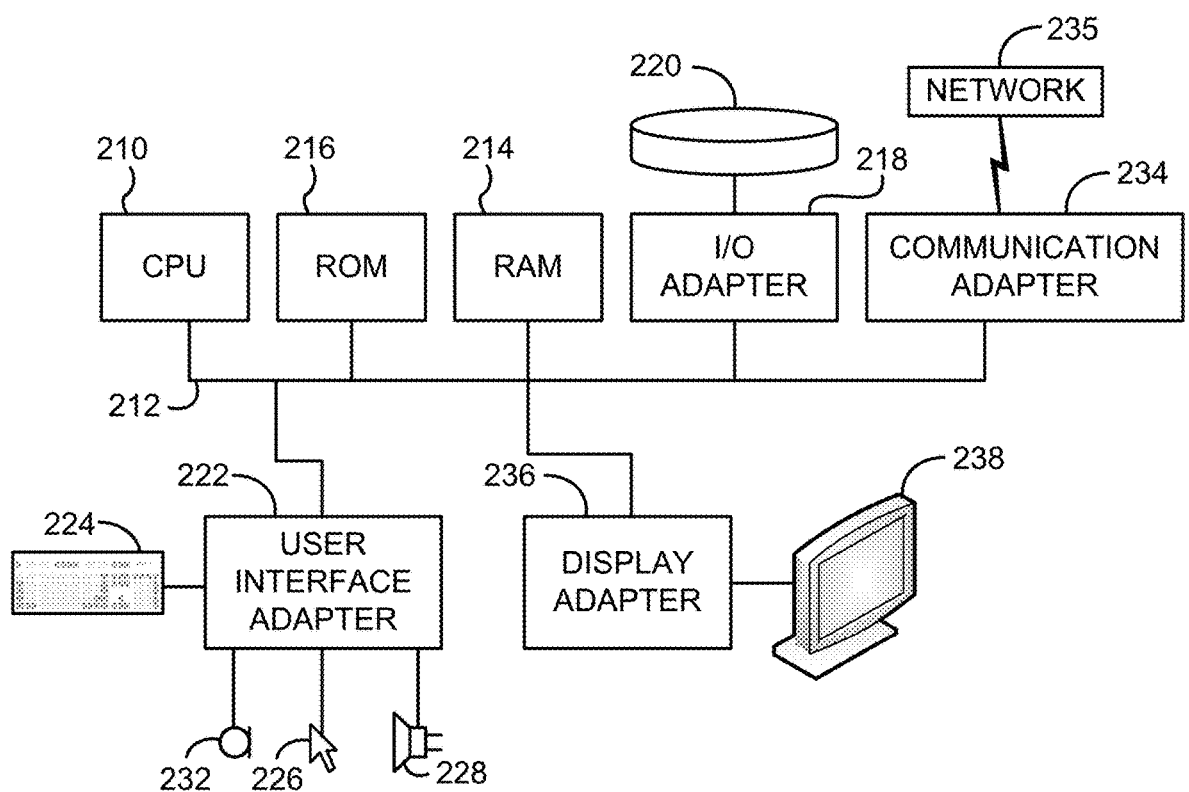
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
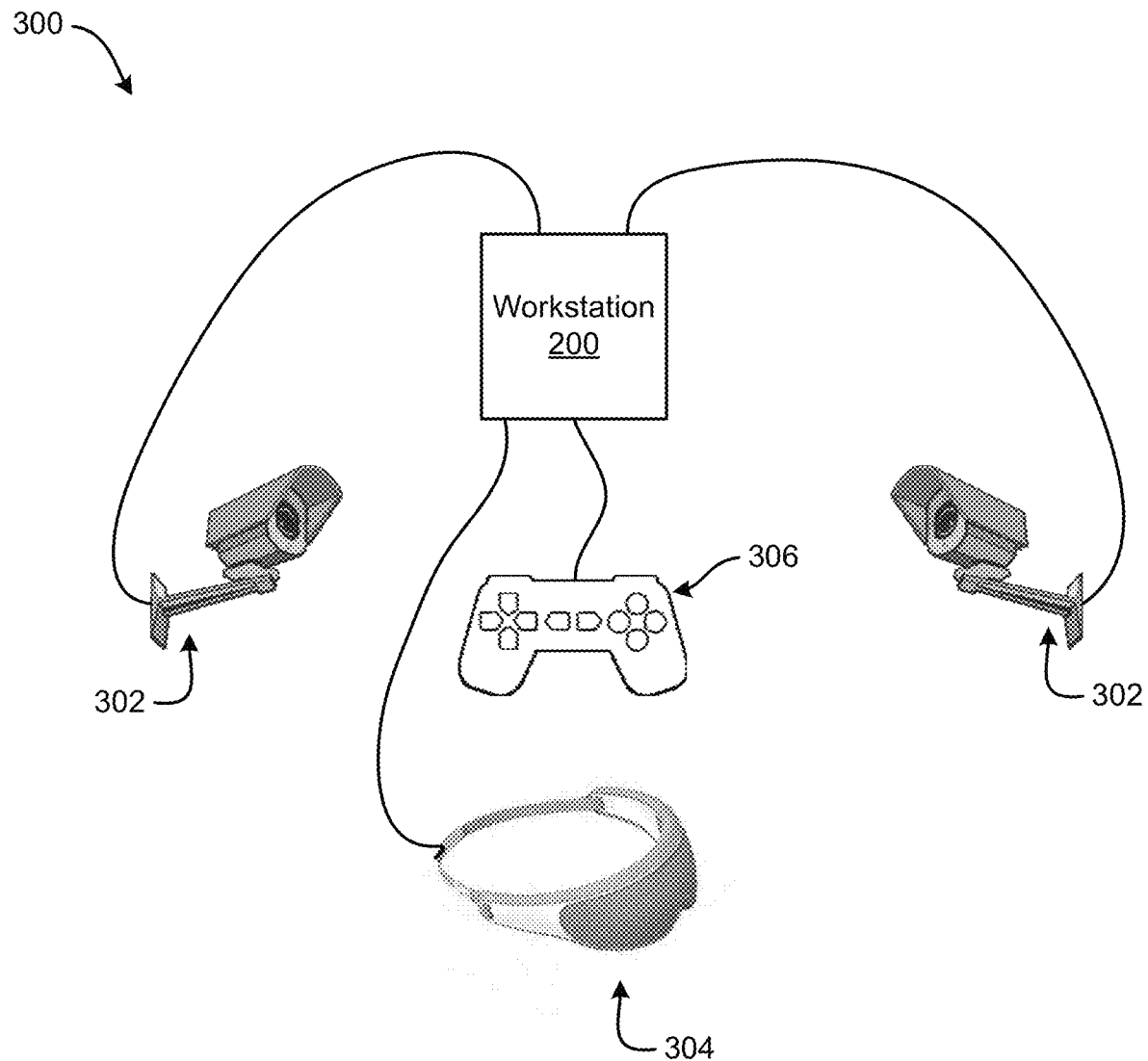
FIG. 3 is a simplified schematic of a virtual reality (VR) system setup, according to one embodiment.

Now referring to FIG. 3, a VR system 300 is shown according to one embodiment. Note that some of the elements shown in FIG. 3 may be implemented as hardware and/or software, according to various embodiments. The VR system 300 may include a number of sensors arranged around/throughout the environment, and the sensors may be independent or integrated into other hardware such as one or more controllers, one or more headsets, one or more microphones, one or more cameras, etc. as would be understood by a person having ordinary skill in the art upon reading the present descriptions. Exemplary sensors include any suitable type of sensor for detecting motion, particularly motion of the headset and/or controller, or capturing optical or auditory signals in the environment. Exemplary sensors include optical sensors, microphones, accelerometers, gyroscopes, magnetometers, seismic sensors, etc. as would be appreciated by a person having ordinary skill in the art upon reading the present descriptions.

The VR system 300 may also include any number of processors, displays, memory, network components, user interfaces, etc. as included in general purpose computing devices or other compute platforms such as shown in FIGS. 1-2. Nonlimiting, exemplary embodiments of VR systems such as shown in FIG. 3 include Sony's PLAYSTATION VR (PSVR), Dell's HTC VIVE, and Oculus' RIFT products, as well as more complex, elaborate systems such as entire rooms or environments fitted with appropriate sensors to provide a VR experience. Simpler embodiments of a VR system 300 as shown in FIG. 3 may include mobile VR systems such as Google DAYDREAM, Samsung's GEAR VR, or Oculus' GO platforms.

According to the embodiment shown in FIG. 3, VR system 300 includes at least one camera 302, at least one headset 304 having an integrated display, and a one or more controllers 306. The VR system 300 may, and preferably does, also include a plurality of additional sensors integrated with the camera 302, headset 304, and/or controller(s) 306. For instance, in particularly preferred embodiments, the headset 304 includes sensors such as an accelerometer, gyroscope, magnetometer, optical sensor(s) (e.g. for analyzing an area surrounding the user), a microphone (e.g. for detecting audio signals not originating from the VR experience), etc. as would be appreciated by a person having ordinary skill in the art upon reading the present disclosure.

The VR system 300 optionally includes a workstation, e.g. a workstation 200 as shown in FIG. 2, or other suitable equivalent thereof such as a gaming console or purpose-built computer, in some embodiments, while in other embodiments the VR system 300 may be provided in the form of a standalone headset 304 and optional controller(s) 306, in which case cameras 302 and workstation 200 may not be present. Standalone headsets 304 preferably include some or all of the components and the functionality of workstation 200.

In any event, VR system 300 includes all functionality required to render a VR environment to a user. A given VR setup may include multiple VR systems such as shown in FIG. 3, e.g. to accommodate multiple users interacting in a same virtual and/or physical space. In more embodiments, a plurality of remote VR systems 300 may communicate via a network to provide a multi-user VR experience.

Returning now to the inventive, cognitive techniques for selectively rendering inputs provided to a VR system, such as VR system 300, the inventive techniques described herein generally involve five stages of activity: tracking user inputs in the real world and VR environs; evaluating VR input against expected behavior, deriving a series of events leading up to the irrelevant input, filtering irrelevant inputs from relevant inputs in order to avoid/prevent the rendering of irrelevant inputs, and an optional but preferred continuous learning phase.

Stage 1: Track User Inputs in a VR Session and in a Real World Environment.

In one exemplary approach, a user is participating in a VR session, wearing a VR headset such as headset 304. Other users in other locations may also be participating in this same VR session. Each user is represented in the VR environment using an avatar. The avatar's movements are tracked to the physical movements of the VR user, as monitored by the VR system (e.g. using a processing unit, camera, movement sensors, etc. as would be understood by a person having ordinary skill in the art upon reading the present descriptions). For example if a VR user physically moves their head to the left, their VR avatar performs the same movement. If the VR user is holding a controller in their hand, the movements they make on that controller are mirrored by their VR avatar.

Inputs monitored/tracked, in various embodiments, may include any combination of the following, as well as equivalents thereof that would be appreciated by a person having ordinary skill in the art upon reading the present disclosure.

In one approach, movements initiated by the VR user, such as head motion, hand/limb motion, body movement, etc. are one form of input that is tracked. The movements may be tracked using a combination of accelerometers, gyroscopes, cameras, etc. of the VR system, in several embodiments.

In another embodiment, controller input such as button presses, analog stick movements, touchscreen/touchpad interactions (e.g. gestures), etc. of a controller paired with the VR system may be tracked. The controller input may, in one instance, be collected/tracked as a series of button presses and/or stick movements (e.g. tracing analog position over time), statistics regarding button presses and/or stick movements, etc. as would be appreciated by a skilled artisan upon reading the present descriptions.

In more embodiments, sound inputs including any audible signal detected by a microphone of the VR system, preferably including human speech, are tracked.

In still more embodiments, video inputs such as streaming video captured by a camera of the VR system can provide relevant information, and are tracked. Valuable information such as information describing the physical area where the VR user is located, who is present in a room, and the other movements a VR user may be making that are not captured by other sensors of the VR system may be captured. For instance, a user may wave an off-hand or gesture to another person outside the camera's field of view, while keeping the controller still in the other hand. The off-hand waving/gesture could be captured by the camera as streaming video, but would otherwise remain undetected using the sensors of the controller, headset, etc.

Notably, the tracked inputs need not be rendered within a given VR environment in order to facilitate discerning relevant inputs from irrelevant inputs. In various implementations of the currently described inventive concepts, tracked inputs may include signals that are rendered in the VR environment and/or signals that are not rendered in the VR environment, and may comprise any one or any combination of the foregoing exemplary inputs, as well as equivalents thereof that would be understood by a person having ordinary skill in the art upon reading these disclosures.

Regardless of the particular type or combination of inputs tracked by the VR system, the first phase of cognitive rendering as described herein includes tracking a user's inputs in real-time using the VR system hardware and associated software. Moreover, user inputs may be tracked over time, including during and after cognitive rendering (or lack of rendering) of a given input or set of inputs, and may be performed continuously during operation of the VR system. Accordingly, even though the present embodiment is described as tracking inputs in a first phase, it should be understood that input tracking may, and preferably does, occur continuously during the user's operation of the VR system. In more embodiments, to facilitate cognitive rendering with different users and/or different VR experiences, tracking may occur or be performed on a per-user basis, a per-application basis, or both.

Stage 2: Cognitive Analysis of Multi-Sensor VR Input Against Expected Behaviors.

In the second phase, which in various embodiments may overlap with the tracking of user inputs in phase one, The VR system compares VR input from a user to expected behavior of a person/avatar under typical operating circumstances. The user purposefully displays activity not relevant to/inconsistent with the VR environment with which the user is interacting.

Exemplary, nonlimiting embodiments of inconsistent input (also referred to herein as "irrelevant input") include spoken input and movement input. Inconsistent/irrelevant spoken input includes anything the user, another user, another person, or some other audible entity (e.g. a pet, virtual assistant, etc.) utters during the VR session. For example, a user playing a VR game instructs his child/pet to stop what they are doing and get ready for bed. Clearly, as this statement is not relevant to the subject matter of the VR experience, it would be desirable to avoid rendering such input going forward.

Exemplary, nonlimiting embodiments of inconsistent/irrelevant movement input include any type of motion not pertinent to the VR experience, e.g. a person raising or removing a VR headset to take a drink, which may cause the in-VR avatar to crane its neck in a disturbing or unnatural manner. Other inconsistent movement inputs may include physically walking around an area, which may cause the avatar to partially or completely disappear from view, e.g. if outside the confines of the VR environment or if overlapping with some object such as a piece of furniture or a wall rendered in the VR environment (e.g. as happens during "clipping" errors).

At any rate, the user displays a series of inconsistent/irrelevant inputs, which the VR system tracks and compares to a knowledge base of expected behaviors. Expected behaviors may be defined manually, e.g. in a manner similar to that being currently described but where the user demonstrates one or more relevant inputs. Expected behaviors may additionally or alternatively include and/or be based on input received from other users, e.g. a VR community. Whether determined manually, based on other users' input, or some other way, expected behavior represents a plurality of stimuli and associated expected behaviors. Each stimulus (e.g. event in the VR experience) may be associated with a plurality of expected behaviors, or only one expected behavior, and associations between expected behaviors and stimuli may change over time, as described in greater detail below.

The VR system compares each input from the VR user with a predefined list of expected behaviors. If the system detects input from a VR user that is not an expected behavior then the input is flagged for further analysis.

Stage 3: Deriving Series of Events Leading Up to Inconsistent/Irrelevant Inputs

When a user exhibits an unexpected behavior, i.e. provides an input that either is not, or does not correspond to, one of the expected behaviors for a given stimulus, one or more analyses are performed in order to determine whether a definitive sequence (or set of sequences) of events leading up to the unexpected behavior can be identified, and if so what sequence(s) are appropriate predictors of a similar upcoming inconsistent/irrelevant input.

In various embodiments, the analyses are performed on data collected prior to the inconsistent/irrelevant input. In this sense the VR system preferably retains all data collected for a predetermined amount of time, e.g. in a buffer, in the event an inconsistent/irrelevant input is detected, and the data in the buffer may be analyzed upon detecting such an inconsistent/irrelevant input. Depending on the nature of the stimulus, the expected behavior(s), and the user, the amount of time may vary. In preferred embodiments, the amount of time is approximately 5 seconds or less, although in various approaches the amount of time may include any amount of time in a range from about 0.01 seconds to about 5 seconds or more, e.g. about 0.5 seconds, about 1 second, about 2 seconds, about 3 seconds, about 4 seconds, or about 5 seconds.

The analyses performed on the retained data may include any combination of visual recognition, visual movement recognition, voice recognition, directional input analysis, and sound level analysis. In various embodiments, any combination of the foregoing analyses may be performed, and may be provided in the form of a service, e.g. an IBM WATSON service, or other known equivalent thereof, as would be appreciated by a person having ordinary skill in the art upon reading the present disclosures.

In one approach, visual recognition services include any suitable form of image classification capable of classifying objects from image data, e.g. furniture, pets, people, and the like. Preferably, the visual recognition services are also capable of identifying individual humans, e.g. using facial recognition, gait analysis, or any other suitable technique that would be appreciated by a person having ordinary skill in the art upon reading the present descriptions.

Visual movement recognition services, in addition to having classification capabilities similar to visual recognition services, are capable of identifying movements of objects and people throughout an environment, e.g. a room. Visual movement recognition services are employed to determine what movements the user, and any other individuals, objects, etc. made during the predetermined amount of time leading up to the irrelevant/inconsistent input. For example, a visual movement recognition service analyzing image data leading up to a user taking a drink of water can recognize the user's arm movements raising/removing the VR headset. Similarly, a visual movement recognition service analyzing image data leading up to a user exiting a field of view of one or more cameras may detect a change in elevation the VR headset (e.g. for a user standing from a sitting position) and/or horizontal location of the VR headset (e.g. for a user walking through a room).

Voice recognition services may include any known technique(s) for identifying individual speakers and/or content of the individual's speech. Voice recognition services may include and/or utilize natural language processing, speech-to-text conversion, tonal analysis, etc. as would be appreciated by a person having ordinary skill in the art upon reading the present descriptions.

Directional input analysis services may, in various embodiments, include any known technique(s) for determining a point of origin, and/or direction, from which a sound was emitted. Directional input services advantageously facilitate distinguishing sounds (e.g. speech) originating from the user versus sounds coming from other points of origin (e.g. other individuals present in the physical environment, unrelated external sounds, etc.).

Sound level analysis services determine the volume or sound level of a given auditory signal, which (especially when coupled with directional input analysis) facilitates determining the point of origin for the given auditory signal, and possibly information regarding distance from one or more microphones of the VR system.

Skilled artisans will appreciate that, in various approaches, the inventive cognitive rendering concepts presented herein may utilize any combination of the foregoing services, as well as any equivalents thereof known in the art. For example, different types of inconsistent/irrelevant inputs may merit different combinations of analyses, e.g. where the input is restricted to speech, then image analysis services may not be necessary, and avoiding the use thereof may relieve resource consumption within the VR system (e.g. reduce memory usage, storage usage, processing power, etc.).

Once the analyses are complete, the VR system is provided as output a correlated list of inconsistencies between received VR input, and corresponding expected behavior(s), as well as environmental/circumstantial factors leading up to the unexpected behavior(s). Environmental and/or circumstantial factors may include, for example and without limitation, a list of individuals who were present during the lead-up time, a series of statements or utterances made during the lead-up time, user movements occurring during the lead-up time, etc. time of day and/or day of week when the inconsistent/irrelevant input was received, user identity, etc. as would be understood by a person having ordinary skill in the art upon reading the present disclosure.

The environmental and/or circumstantial factors associated with each received inconsistent/irrelevant input are retained, preferably in a repository unique to the user who provided the inconsistent/irrelevant input. Each repository is preferably unique to the user because different users may exhibit entirely different behavior and/or experience entirely different environmental/circumstantial events leading up to a similar input.

Stage 4: Continuous Monitoring and Filtering of VR Inputs

Having the correlated list of inconsistent/irrelevant inputs and associated factors, the VR system is capable of monitoring a physical environment in real-time and predicting occurrence of an upcoming unexpected behavior.

For example, if the system detects a series of external factors occurring that previously led to inconsistent/irrelevant VR input, the system flags said factor(s). A single factor, or a sequence of factors may trigger the flag, in various approaches. Exemplary single factors may include a user making a single motion or utterance leading up to an inconsistent/irrelevant input, such as the last time a user raised both of their hands to their head it resulted in the user removing their VR headset to take a drink, resulting in inconsistent behavior in the VR environment (the user's avatar's head moving unnaturally). Exemplary factor sequences may include any set of motions, sounds, etc. leading up to an inconsistent/irrelevant input. For instance, the last time the VR user's child came into the room, at 8:30 pm on a weekday, and spoke to the VR user, the VR user replied to the child and that reply was broadcast in a VR session. This conversation was inconsistent behavior in the context of the VR environment.

A weighting is assigned the various factors, based on the number of previous occurrences of such factor(s) that ultimately led to inconsistent/irrelevant input being rendered in the VR environment. For example if the action of a user raising both hands to their head has resulted in inconsistent VR behavior in 20 consecutive occurrences, this factor is weighted high. If this is the first occurrence the weighting is lower. In each case, the weight represents a probability of the particular factor or series of factors leading to receipt of an inconsistent/irrelevant input. Accordingly, weights may each be a value in a range from 0.0-1.0, or may be expressed as a percentage, in various embodiments.

If the system detects a sequence that is weighed above a predefined threshold, then the VR system filters the following input(s), such that likely inconsistent/irrelevant inputs are not rendered. Filtering may include ignoring the next input received by the VR system, ignoring a predefined number or type of subsequent inputs (e.g. ignoring the next 3 inputs, ignoring the next audio input, ignoring the next 5 controller inputs, etc. in various combinations as described elsewhere herein and would be appreciated by a person having ordinary skill in the art upon reading the present descriptions), ignoring inputs received for a predetermined amount of time by the VR system, etc. as would be appreciated by a skilled artisan reading the present descriptions.

The threshold may be predefined based on the user's tolerance for inconsistent/irrelevant inputs during a VR experience, with lower thresholds resulting in more liberal filtering (i.e. decreasing the likelihood of a given input or series of inputs being rendered in the VR environment), and higher thresholds allowing more inputs to be rendered in the VR environment. In one preferred embodiment, a threshold of 0.7 or 70%, equivalently, was experimentally determined to be a reasonable cutoff point for filtering irrelevant/inconsistent inputs.

The threshold may be set to a default value, or by an administrator or user of the VR system. In various embodiments, a global threshold may be used for filtering any or all types of possible inconsistent/irrelevant inputs, or alternatively each type of inconsistent/irrelevant input may have associated therewith a different threshold. In the latter case, the threshold may reflect tolerance (or lack thereof) for rendering the specific input in a VR environment. For example, inputs leading to relatively benign renderings such as an avatar's head moving in a strange direction may have associated therewith higher thresholds to avoid inappropriately filtering a consistent/relevant input, while inputs leading to relatively malignant renderings such as foul language, may have associated therewith lower thresholds to avoid rendering the input, even if at the cost of inappropriately filtering a consistent/relevant input.

In the foregoing manner, the presently described inventive concepts provide a cognitive approach to selectively rendering only relevant/consistent inputs in the context of a VR environment and/or experience. By identifying factor(s) known from experience to lead up to, or likely lead up to, an undesired event, subsequent input(s) may be filtered and thus not rendered in the VR environment. Accordingly, the inventive principles described herein represent an improvement to the field of virtual reality, and specifically to improve/preserve the immersive nature of VR experiences in multi-user settings.

Stage 5: Self-Learning and Feedback-Based Improvements

Although entirely optional, in preferred approaches the inventive concepts described herein include a self-learning mechanism, as well as a feedback-based approach to improving predictions of future inconsistent/irrelevant inputs.

Users can help train the system to learn when certain VR inputs may lead to unwanted inconsistencies. For example if the user always presses the mute button when a certain individual enters the room, the system can learn to automate this task (when the system detects the person entering the room, do not broadcast captured audio in the VR environment).

Users may also provide feedback to the system to improve future predictions. The user can provide positive or negative input in response to the system not rendering a particular action. For example, positive input affirming an action informs the system that it was correct in not rendering a particular VR input. For example the system correctly did not render a movement in the VR space because the user was raising their headset to take a drink. Negative input informs the system that it was incorrect by not rendering a particular VR input. For example it incorrectly muted the user's microphone when it should not have.

The system uses this input for self-learning to adjust its weightings and/or thresholds for determining when to render or not render VR input based on a previously-observed sequence of events. For instance, weights may be increased to increase the likelihood of flagging future events associated with such weights for continuous monitoring, or decreased to decrease the likelihood of flagging future events associated with such weights for continuous monitoring. Additionally or alternatively, the predetermined filtering threshold may be increased to make the system more tolerant to potentially inconsistent/irrelevant inputs, or lowered to make the system more "greedy" and more likely to ignore future inputs in response to detecting a particular event or series of events.

Figure 4:
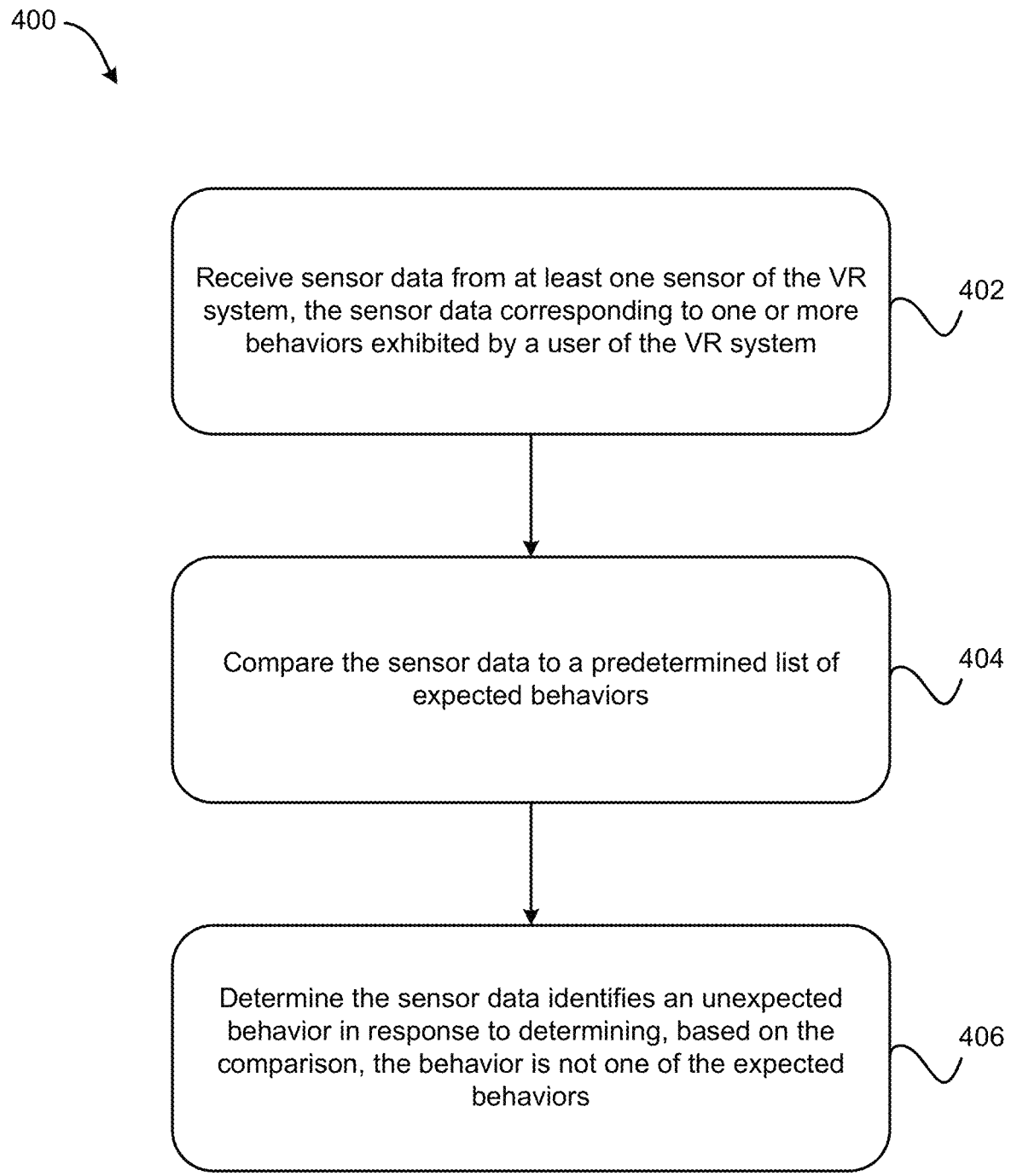
FIG. 4 is a flowchart of a method, according to one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a VR system 300 as shown in FIG. 3, optionally a standalone VR headset 304, or some other device having one or more processors and integrated sensors as discussed above. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where sensor data are received from at least one sensor of the VR system. The sensor data correspond to one or more behaviors exhibited by a user of the VR system. As detailed above, the sensor data may include any type of data representing signals/events detected by the sensor. The sensor data may, and preferably does, comprise a combination of different types of data and/or corresponds to different types of behaviors, such as auditory signals corresponding to a user's speech; optical signals corresponding to a user's movements within/throughout a physical space; electronic signals indicating a user's interaction with a controller, etc. as would be appreciated by a person having ordinary skill in the art upon reading the present descriptions.

In operation 404 the sensor data received in operation 402 are compared to a predetermined list of expected behaviors. As described hereinabove, the list of expected behaviors is preferably a predefined list generated manually or by observing a user under controlled circumstances and performing one or more actions that are expected to be performed in response to a particular stimulus or event in a VR experience. Additionally or alternatively, expected behaviors may be derived from aggregating responses by a plurality of users to the same stimulus.

For example, in response to another user's avatar presenting our user's avatar a question or greeting, an expected behavior may be one of a predetermined number of suitable responses, or performing a particular gesture, while unexpected behaviors may include inconsistent/irrelevant inputs, such as our user making a statement about a pet in physical proximity to the user, a statement responding to a question or statement made by another individual in physical proximity to the user but not participating in the VR experience, or any other unsuitable form of response, such as will be understood by skilled artisans upon reading the present descriptions.

In response to determining the behavior represented by the sensor data is not one of the predetermined list of expected behaviors, in operation 406 method 400 includes determining the sensor data identifies an unexpected behavior.

Accordingly, method 400 represents a unique and advantageous manner for determining whether a user's behavior in the context of a VR experience or environment is expected or not. Unexpected behaviors, as noted throughout these descriptions, correspond to inconsistent or irrelevant inputs and are preferably filtered from (not rendered within) the VR environment.

Accordingly, and commensurate with various embodiments of the presently disclosed inventive concepts, method 400 may include any combination or permutation of additional or alternative features described herein. Moreover, the method 400 may be provided in the form of a system, e.g. a VR system and/or computer program product running on a VR system, in myriad implementations.

For instance, in one approach method 400 may include analyzing the sensor data using one or more behavioral analyses to determine whether one or more events leading up to the unexpected behavior are predictive of the unexpected behavior occurring at a later point in time. As noted above, the one or more behavioral analyses may include any combination of: visual recognition, visual movement recognition, voice recognition, directional input analysis, and/or sound level analysis.

Method 400 may also, in one approach and in response to determining the one or more events leading up to the unexpected behavior are predictive of the unexpected behavior occurring at the later point in time, include continuously monitoring input received by the VR system to detect a subsequent occurrence of a same or similar sequence of events. The input monitored from this point on may include any type of input received by the VR system, including but not limited to input that is rendered by the VR system and input that is not rendered by the VR system.

In response to detecting a subsequent occurrence of the one or more events and the unexpected behavior, method 400 may involve increasing a value of at least one of a plurality of weights, each weight being associated with one of the events and reflecting a probability that the one of the events will be followed by the unexpected behavior.

In even more embodiments, and again in response to detecting a subsequent occurrence of the one or more events, method 400 may include comparing a total weight of the one or more events to a predetermined filtering threshold. Moreover, in response to determining the total weight of the one or more events is greater than the predetermined filtering threshold such as 70%, method 400 may ignore one or more subsequent inputs received by the VR system so as to avoid rendering the one or more subsequent VR inputs received by the VR system in the VR environment.

Preferably, but optionally, method 400 may include a self-learning/feedback functionality, whereby user feedback affirming or negating a previous decision to ignore one or more subsequent inputs received by the VR system is received, and in response, either a value of the weights associated with the one or more events are increased in response to the user feedback negating the previous decision to ignore the one or more subsequent inputs; the predetermined filtering threshold is decreased in response to the user feedback affirming the previous decision to ignore the one or more subsequent inputs, or both. As will be appreciated by skilled artisans reading the present descriptions, Higher weights translate to a higher chance of a given behavior being caught/flagged for comparison to expected behaviors, while a lower filtering threshold results in more inputs being ignored.

Conversely, in response to receiving user feedback affirming a previous decision to ignore subsequent inputs, weights associated with corresponding events may be lowered, and/or in response to receiving user feedback negating a previous decision to ignore subsequent inputs, the filtering threshold associated therewith may be increased.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

Moreover, while the presently disclosed inventive subject matter has been presented primarily in the context of a multi-user, social VR experience, it shall be understood that the principles underlying that subject matter are equally applicable to other VR experiences, and in applications other than multi-user VR. For example, the presently described inventive concepts may be implemented in VR training exercises for medical professionals, armed service members, pilots, etc. as would be appreciated by a person having ordinary skill in the art upon reading the present disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for cognitive rendering of inputs received by a virtual reality (VR) system, the method comprising:
   receiving sensor data from at least one sensor of the VR system, the sensor data corresponding to one or more behaviors exhibited by a user of the VR system;
   comparing the sensor data to a predetermined list of expected behaviors;
   determining the sensor data identifies an unexpected behavior in response to determining, based on the comparison, the behavior is not one of the expected behaviors;
   analyzing the sensor data using one or more behavioral analyses to determine whether one or more events leading up to the unexpected behavior are predictive of the unexpected behavior occurring at a later point in time;
   in response to determining the one or more events leading up to the unexpected behavior are predictive of the unexpected behavior occurring at the later point in time, continuously monitoring input received by the VR system to detect a subsequent occurrence of a same or similar sequence of one or more events;
   in response to detecting the subsequent occurrence of the same or similar sequence of one or more events, comparing a total weight of the same or similar sequence of one or more events to a predetermined filtering threshold; and
   in response to determining the total weight of the same or similar sequence of one or more events is greater than the predetermined filtering threshold, ignoring one or more subsequent inputs received by the VR system so as to avoid rendering the one or more subsequent inputs received by the VR system.

2. The method as recited in claim 1, wherein the one or more behavioral analyses are selected from the group consisting of: visual recognition, visual movement recognition, voice recognition, directional input analysis, and sound level analysis.

3. The method as recited in claim 1, comprising, in response to detecting the subsequent occurrence of the same or similar sequence of one or more events and the unexpected behavior, increasing a value of at least one of a plurality of weights, each weight being associated with one of the events and reflecting a probability that the one of the events will be followed by the unexpected behavior.

4. The method as recited in claim 1, comprising receiving user feedback affirming or negating a previous decision to ignore one or more subsequent inputs received by the VR system, and either:
   increasing a value of one or more weights associated with the one or more events in response to the user feedback negating the previous decision to ignore the one or more subsequent inputs;
   decreasing the predetermined filtering threshold in response to the user feedback affirming the previous decision to ignore the one or more subsequent inputs; or
   both increasing the value of the one or more weights associated with the one or more events in response to the user feedback negating the previous decision to ignore the one or more subsequent inputs, and decreasing the predetermined filtering threshold in response to the user feedback affirming the previous decision to ignore the one or more subsequent inputs.

5. The method as recited in claim 1, comprising tracking one or more movements of a VR avatar to one or more physical movements of the user.

6. A computer program product for cognitive rendering of inputs received by a virtual reality (VR) system, the computer program product comprising a computer readable storage medium having program instructions embodied therewith, wherein the computer readable storage medium is not a transitory signal per se, the program instructions executable by the VR system to cause the VR system to perform a method comprising:
   receiving sensor data from at least one sensor of the VR system, the sensor data corresponding to one or more behaviors exhibited by a user of the VR system;
   comparing, using a processor of the VR system, the sensor data to a predetermined list of expected behaviors;
   determining, using the processor, the sensor data identifies an unexpected behavior in response to determining, based on the comparison, the behavior is not one of the expected behaviors;
   analyzing, using the processor, the sensor data using one or more behavioral analyses to determine whether one or more events leading up to the unexpected behavior are predictive of the unexpected behavior occurring at a later point in time;
   in response to determining the one or more events leading up to the unexpected behavior are predictive of the unexpected behavior occurring at the later point in time, continuously monitoring input received by the VR system to detect a subsequent occurrence of a same or similar sequence of one or more events;
   in response to detecting the subsequent occurrence of the same or similar sequence of one or more events, comparing, using the processor, a total weight of the same or similar sequence of one or more events to a predetermined filtering threshold; and
   in response to determining the total weight of the same or similar sequence of one or more events is greater than the predetermined filtering threshold, ignoring one or more subsequent inputs received by the VR system so as to avoid rendering the one or more subsequent inputs received by the VR system.

7. The computer program product as recited in claim 6, wherein the one or more behavioral analyses are selected from the group consisting of: visual recognition, visual movement recognition, voice recognition, directional input analysis, and sound level analysis.

8. The computer program product as recited in claim 6, comprising program instructions executable by the VR system to cause the VR system, in response to detecting the subsequent occurrence of the same or similar sequence of one or more events and the unexpected behavior, to: increase a value of at least one of a plurality of weights, each weight being associated with one of the events and reflecting a probability that the one of the events will be followed by the unexpected behavior.

9. The computer program product as recited in claim 8, comprising program instructions executable by the VR system to cause the VR system to:
   receive user feedback affirming or negating a previous decision to ignore one or more subsequent inputs received by the VR system, and either:
      increase a value of one or more weights associated with the one or more events in response to the user feedback negating the previous decision to ignore the one or more subsequent inputs;
      decrease the predetermined filtering threshold in response to the user feedback affirming the previous decision to ignore the one or more subsequent inputs; or
      both increase the value of the one or more weights associated with the one or more events in response to the user feedback negating the previous decision to ignore the one or more subsequent inputs, and decrease the predetermined filtering threshold in response to the user feedback affirming the previous decision to ignore the one or more subsequent inputs.

10. The computer program product as recited in claim 6, comprising program instructions executable by the VR system to cause the VR system to track one or more movements of a VR avatar to one or more physical movements of the user.

11. A virtual reality (VR) system, comprising:
   a processor; and
   logic integrated with the processor, executable by the processor, or integrated with and executable by the processor, the logic being configured to:
   receive sensor data from at least one sensor of the VR system, the sensor data corresponding to one or more behaviors exhibited by a user of the VR system;
   compare the sensor data to a predetermined list of expected behaviors;
   determine the sensor data identifies an unexpected behavior in response to determining, based on the comparison, the behavior is not one of the expected behaviors;
   analyze the sensor data using one or more behavioral analyses to determine whether one or more events leading up to the unexpected behavior are predictive of the unexpected behavior occurring at a later point in time;
   in response to determining the one or more events leading up to the unexpected behavior are predictive of the unexpected behavior occurring at the later point in time, continuously monitor input received by the VR system to detect a subsequent occurrence of a same or similar sequence of one or more events;
   in response to detecting the subsequent occurrence of the same or similar sequence of one or more events, compare a total weight of the same or similar sequence of one or more events to a predetermined filtering threshold; and in response to determining the total weight of the same or similar sequence of one or more events is greater than the predetermined filtering threshold, ignore one or more subsequent inputs received by the VR system so as to avoid rendering the one or more subsequent inputs received by the VR system.

12. The system as recited in claim 11, comprising, in response to detecting the subsequent occurrence of the same or similar sequence of one or more events and the unexpected behavior, increasing a value of at least one of a plurality of weights, each weight being associated with one of the events and reflecting a probability that the one of the events will be followed by the unexpected behavior.

13. The system as recited in claim 11, comprising logic configured to: receive user feedback affirming or negating a previous decision to ignore one or more subsequent inputs received by the VR system, and either:

increasing a value of one or more weights associated with the one or more events in response to the user feedback negating the previous decision to ignore the one or more subsequent inputs;

decreasing the predetermined filtering threshold in response to the user feedback affirming the previous decision to ignore the one or more subsequent inputs; or both increase the value of the one or more weights associated with the one or more events in response to the user feedback negating the previous decision to ignore the one or more subsequent inputs, and decrease the predetermined filtering threshold in response to the user feedback affirming the previous decision to ignore the one or more subsequent inputs.

14. The system as recited in claim 3, comprising logic configured to track one or more movements of a VR avatar to one or more physical movements of the user.

* * * * *